(12) United States Patent
Murrell et al.

(10) Patent No.: US 7,860,921 B2
(45) Date of Patent: *Dec. 28, 2010

(54) UNIFORM NETWORK ACCESS

(75) Inventors: Stephen J. Murrell, Miami, FL (US);
Henry L. Hamman, Miami, FL (US)

(73) Assignee: Peer Communications Corporation, Newport Beach, CA (US)

( * ) Notice: Subject to any disclaimer, the term of this patent is extended or adjusted under 35 U.S.C. 154(b) by 817 days.

This patent is subject to a terminal disclaimer.

(21) Appl. No.: 11/173,856

(22) Filed: Jun. 30, 2005

(65) Prior Publication Data

US 2005/0246412 A1  Nov. 3, 2005

Related U.S. Application Data

(63) Continuation of application No. 10/361,920, filed on Feb. 10, 2003, now Pat. No. 6,961,748, which is a continuation-in-part of application No. 09/310,411, filed on May 12, 1999, now Pat. No. 6,519,625.

(60) Provisional application No. 60/105,858, filed on Oct. 27, 1998.

(51) Int. Cl.
*G06F 15/16* (2006.01)
(52) U.S. Cl. .................. 709/202; 709/227; 709/229
(58) Field of Classification Search ......... 709/200–203, 709/217–227, 229, 230, 231, 232, 233–234
See application file for complete search history.

(56) References Cited

U.S. PATENT DOCUMENTS

| | | | |
|---|---|---|---|
| 4,782,485 A | 11/1988 | Gollub | |
| 4,800,488 A | 1/1989 | Agrawal et al. | |
| 4,914,571 A | 4/1990 | Baratz et al. | |
| 4,932,022 A | 6/1990 | Keeney et al. | |
| 5,127,001 A | 6/1992 | Steagall et al. | |
| 5,315,705 A | 5/1994 | Iwami et al. | |
| 5,339,435 A | 8/1994 | Lubkin et al. | |
| 5,408,619 A | 4/1995 | Oran | |
| 5,600,649 A | 2/1997 | Sharma et al. | |

(Continued)

FOREIGN PATENT DOCUMENTS

EP  0581722 A1  2/1994

OTHER PUBLICATIONS

*Peer Communications Corporation* vs. *Skype Technologies SA, Skype, Inc., and Ebay, Inc.*; Civil Action No. 6 :06CV370 (LED); Invalidity Contentions (18 pages), Appendix A (13 pages), Appendix B (52 pages), Appendix C (57 pages) dated Apr. 23, 2007.

(Continued)

*Primary Examiner*—Moustafa M Meky
(74) *Attorney, Agent, or Firm*—Martin & Ferraro, LLP

(57) ABSTRACT

According to some embodiments, a registry is displayed. The registry may, for example, indicate resources available from a plurality of remote network access devices via a communications network. Moreover, a personal network address may be associated with each available resource, the personal network address including an destination address portion and an application program identifier portion. A direct communications link may then be established between a first network access device hosting an available resource and a second network address device using the personal network address associated with the resource.

19 Claims, 9 Drawing Sheets

U.S. PATENT DOCUMENTS

| | | | |
|---|---|---|---|
| 5,649,194 A | 7/1997 | Miller et al. | |
| 5,689,641 A | 11/1997 | Ludwig et al. | |
| 5,692,180 A | 11/1997 | Lee | |
| 5,742,829 A | 4/1998 | Davis et al. | |
| 5,754,857 A | 5/1998 | Gadol | |
| 5,761,499 A | 6/1998 | Sonderegger | |
| 5,790,532 A | 8/1998 | Sharma et al. | |
| 5,790,548 A | 8/1998 | Sistanizadeh et al. | |
| 5,793,962 A | 8/1998 | Badovinatz et al. | |
| 5,805,785 A | 9/1998 | Dias et al. | |
| 5,805,786 A | 9/1998 | Badovinatz et al. | |
| 5,828,843 A | 10/1998 | Grimm et al. | |
| 5,832,191 A * | 11/1998 | Thorne | 358/1.15 |
| 5,835,721 A * | 11/1998 | Donahue et al. | 709/224 |
| 5,867,161 A * | 2/1999 | Walsh | 715/808 |
| 5,893,107 A | 4/1999 | Chan | |
| 5,893,116 A * | 4/1999 | Simmonds et al. | 707/201 |
| 5,923,885 A | 7/1999 | Johnson et al. | |
| 5,941,954 A * | 8/1999 | Kalajan | 709/239 |
| 5,956,485 A | 9/1999 | Perlman | |
| 5,987,376 A | 11/1999 | Olson et al. | |
| 5,991,807 A | 11/1999 | Schmidt et al. | |
| 6,002,871 A * | 12/1999 | Duggan et al. | 717/135 |
| 6,009,469 A | 12/1999 | Mattaway et al. | |
| 6,031,977 A | 2/2000 | Pettus | |
| 6,044,405 A * | 3/2000 | Driscoll et al. | 709/232 |
| 6,047,054 A | 4/2000 | Bayless et al. | |
| 6,049,819 A | 4/2000 | Buckle et al. | |
| 6,055,373 A | 4/2000 | McElroy et al. | |
| 6,061,349 A | 5/2000 | Coile et al. | |
| 6,067,086 A * | 5/2000 | Walsh | 715/808 |
| 6,067,577 A | 5/2000 | Beard | |
| 6,078,990 A | 6/2000 | Frazier | |
| 6,081,812 A | 6/2000 | Boggs et al. | |
| 6,104,701 A * | 8/2000 | Avargues et al. | 370/238 |
| 6,105,122 A | 8/2000 | Muller et al. | |
| 6,108,704 A | 8/2000 | Hutton et al. | |
| 6,112,228 A * | 8/2000 | Earl et al. | 709/205 |
| 6,115,549 A | 9/2000 | Janis et al. | |
| 6,128,647 A | 10/2000 | Haury | |
| 6,131,121 A | 10/2000 | Mattaway et al. | |
| 6,148,349 A | 11/2000 | Chow et al. | |
| 6,151,624 A * | 11/2000 | Teare et al. | 709/217 |
| 6,167,432 A | 12/2000 | Jiang | |
| 6,182,141 B1 | 1/2001 | Blum et al. | |
| 6,202,156 B1 * | 3/2001 | Kalajan | 726/11 |
| 6,314,459 B1 * | 11/2001 | Freeman | 709/220 |
| 6,353,850 B1 | 3/2002 | Wies et al. | |
| 6,353,856 B1 | 3/2002 | Kanemaki | |
| 6,360,266 B1 | 3/2002 | Pettus | |
| 6,449,344 B1 | 9/2002 | Goldfinger | |
| 6,466,981 B1 * | 10/2002 | Levy | 709/227 |
| 6,473,406 B1 | 10/2002 | Coile et al. | |
| 6,493,743 B2 * | 12/2002 | Suzuki | 709/203 |
| 6,513,066 B1 | 1/2003 | Hutton et al. | |
| 6,519,625 B1 | 2/2003 | Murrell et al. | |
| 6,546,005 B1 * | 4/2003 | Berkley et al. | 370/353 |
| 6,578,198 B2 * | 6/2003 | Freeman et al. | 717/168 |
| 6,647,393 B1 | 11/2003 | Dietterich et al. | |
| 6,657,956 B1 * | 12/2003 | Sigaud | 370/230 |
| 6,678,719 B1 * | 1/2004 | Stimmel | 709/204 |
| 6,701,365 B1 | 3/2004 | Hutton et al. | |
| 6,839,734 B1 | 1/2005 | Vega-Garcia et al. | |
| 6,859,819 B1 | 2/2005 | Rosenberg et al. | |
| 6,909,708 B1 | 6/2005 | Krishnaswamy et al. | |
| 6,961,748 B2 | 11/2005 | Murrell et al. | |
| 7,111,079 B2 * | 9/2006 | Cheng | 709/249 |
| 7,308,511 B2 * | 12/2007 | Wilson et al. | 710/8 |
| 7,408,920 B2 * | 8/2008 | Berkley et al. | 370/352 |
| 7,529,796 B2 * | 5/2009 | Riddle | 709/204 |
| 7,580,919 B1 | 8/2009 | Hannel et al. | |
| 2002/0023037 A1 | 2/2002 | White, Jr. | |

OTHER PUBLICATIONS

*Peer Communications Corporation* vs. *Skype Technologies SA, Skype, Inc., and Ebay, Inc.*; Civil Action No. 6 :06CV370 (LED); Memorandum Opinion (23 pages) dated May 29, 2008.

*Peer Communications Corporation* vs. *Skype Technologies SA, Skype, Inc., and Ebay, Inc.*; Civil Action No. 6 :06CV370 (LED); Order (3 pages) dated Jun. 25, 2008.

*Peer Communications Corporation* vs. *Skype Technologies SA, Skype, Inc., and Ebay, Inc.*; Civil Action No. 6 :06CV370 (LED); Memorandum Opinion & Order (6 pages) dated Aug. 7, 2008.

Abdel-Wahab, Hussein M. et al., "XTV: A Framework for Sharing X Window Clients in Remote Synchronous Collaboration", IEEE Conference on Communications Software: Communications for Distributed Applications & Systems, Apr. 18-19, 1991; cover page and pp. 159-167.

"About Hotline Communications", 1997, 2 pages.

Ahuja, Sudhir et al., "Coordination and Control of Multimedia Conferencing," IEEE Communications Magazine, May 1992, pp. 38-43.

Ahuja, S. et al., "The Rapport Multimedia Conferencing System," ACM, 1988, pp. 1-8.

Albitz, Paul et al., "DNS and BIND in a Nutshell", O'Reilly & Associates, Inc., Oct. 1992, 413 pages.

Ammar, Mostafa H., et al., "Using Hint Tables to Locate Resources in Distributed Systems", IEEE, 1988, pp. 1050-1059.

Anderson, Thomas E. et al., "Serverless Network File Systems", Operating Systems Review: A Publication of the Association for Computing Machinery Special Interest Group on Operating Systems vol. 29, No. 5, Dec. 1995, 2 cover pages and pp. 109-126.

Anklesaria, F. et al., "The Internet Gopher Protocol", Network Working Group, Request for Comments: 1436, Mar. 1993, pp. 1-16.

Atkinson R., "Key Exchange Delegation Record for the DNS", Network Working Group, Request for Comments: 2230, Nov. 1997, pp. 1-11.

Avara press release; Ambrosia Software Releases Avara: Survival in 3D Geometric Jungles, Sep. 17, 1996, 2 pages.

Belville, Sharon, "Zephyr on Athena", Massachusetts Institute of Technology (MIT), Sep. 10, 1991, 33 pages.

Bernabeu-Auban, Jose M. et al. "Optimizing a generalized polling protocol for resource finding over a multiple access channel", Computer Networks and ISDN Systems, 1995, pp. 1429-1445.

Berners-Lee, T. et al., "Uniform Resource Locators (URL)", Network Working Group, Request for Comments: 1738, Dec. 1994, pp. 1-25.

Bever, M. et al., "Distributed Systems, OSF DCE, and Beyond", Oct. 1993, pp. 1-20.

Birrell, Andrew D. et al., "Grapevine: An Exercise in Distributed Computing", Communications of the ACM, vol. 25, No. 4, Apr. 1982, pp. 260-274.

Bowman, Mic et al., "Univers: An Attribute-based Name Server", John Wiley & Sons, Ltd., 1990, cover page and pp. 403-424.

Campbell, Monica, "Hotline boosts Internet communication", MacWeek Online, vol. 11, Issue 10; "http://web.archive.org/web/19970502202626/www.macweek.com/mw¯1110/gw_hotll..." Mar. 4, 1997, 2 pages.

Chang, Wan-Teh, et al., "Call Processing and Signaling in a Desktop Multimedia Conferencing System," Proc. Of Globecom, Dec. 1992, pp. 225-229.

Cheriton, David R. et al., "A Decentralized Naming Facility", Computer Science Department Stanford University, Feb. 1, 1986, pp. 1-28.

Cheriton, David R., "The V Distributed System", Communication of the ACM, vol. 31 No. 3, Mar. 1988, pp. 314-333.

Cheriton, David R. et al., "Decentralizing a Global Naming Service for Improved Performance and Fault Tolerance", Computer Science Department Stanford University, Apr. 3, 1997, pp. 1-28.

Clark, David D., "Name, Addresses, Ports, and Routes", Jul. 1982, pp. 1-14.

Clark, William, "Multipoint Multimedia Conferencing," IEEE Communications Magazine, May 1992, pp. 44-50.

Cockwell, Andrew, "Street Cred: Hot Connection", Wired News, "http://web.archive.org/web/19990428094526/www.wired.com/news/news/technology...", Sep. 17, 1997, 1 page.
Comer, Douglas E., "Internetworking With TCP/IP: Vol 1: Principles, Protocols, and Architecture: Third Edition", Prentice Hall, 1995, 331 pages.
Craft, Daniel H., "Resource Management in a Decentralized System", Operating Systems Review: A Quarterly Publication of the Special Group on Operating Systems vol. 17 No. 5, Oct. 1983, 2 cover pages and pp. 11-19.
Dellafera, C. Anthony, et al., "The Zephyr Notification Service", USENIX Winter Conference, Feb. 9-12, 1988, pp. 213-219.
Droms, R., "Dynamic Host Configuration Protocol", Network Working Group, Request for Comments: 1541, Oct. 1993, pp. 1-39.
"Feature Suggestions Round 2;" email exchange; Jan. 25-28, 1997; 2 pages.
Fleisch, B. et al., "High Performance Distributed Objects Using Distributed Shared Memory and Remote Method Invocation," IEEE, 1998, 5 pages.
Fox, Brian, et al., "GNU Finger Program documentation", 1988, pp. 1-15.
Frantz, W. et al., "Network Selective Resource and Status Information Distribution" IBM Technical Disclosure Bulletin, vol. 34 No. 4A, Sep. 1991, 377-379 pages.
French, Robert S. et al., "The Zephyr Programmer's Manual Revision; 2.1", May 5, 1989, 89 pages.
"Frequently-Asked Questions about Tribal Voice's PowWow, version 0.34", Mar. 4, 1996, 115 pages.
Gaffin, Adam, "VocalTec ware lets users make voice calls over 'Net", Network World, Feb. 15, 1995, pp. 4 and 77.
Gong, Fengmin, "Multipoint Audio and Video Control for Packet-Based Multimedia Conferencing," ACM, 1994, pp. 425-432.
Gopal, P. M. et al., "Consistent Resource Registration", IBM Technical Disclosure Bulletin, vol. 37 No. 09, Sep. 1994, pp. 289-294.
Gopal, Inder et al., "Directories for networks with casually connected users", IEEE, 1988, pp. 1060-1064.
Goretsky, Aryeh, "PowWow for Microsoft Windows User's Guide Version 1.5", Tribal Voice, 1995, pp. 1-15.
Goretsky, Aryeh, "PowWow for Microsoft Windows User's Guide Version 1.6 beta", Tribal Voice, 1995, pp. 1-20.
Goretsky, Aryeh, "PowWow for Microsoft Windows User's Guide Version 1.6 beta 2", Tribal Voice, 1995, pp. 1-20.
Goretsky, Aryeh, "PowWow for Microsoft Windows User's Guide Version 1.7 beta 1", Tribal Voice, 1995, pp. 1-20.
Goretsky, Aryeh, "PowWow for Microsoft Windows User's Guide Version 1.7 beta 2", Tribal Voice, 1995, pp. 1-20.
Goretsky, Aryeh, "PowWow for Microsoft Windows User's Guide Version 1.7 beta 3", Tribal Voice, 1995, pp. 1-20.
Goretsky, Aryeh, "PowWow for Microsoft Windows User's Guide Version 1.7 beta 4", Tribal Voice, 1995, pp. 1-20.
Goretsky, Aryeh, "PowWow for Microsoft Windows User's Guide Version 2.0 beta 1", Tribal Voice, 1995, 28 pages.
Goretsky, Aryeh, "PovvWow for Microsoft Windows User's Guide Version 2.0 beta 2", Tribal Voice, 1995, 30 pages.
Goretsky, Aryeh, "PowWow for Microsoft Windows User's Guide Version 2.1", Tribal Voice, 1995, 30 pages.
Goretsky, Aryeh, "PowWow for Microsoft Windows User's Guide Version 2.2 beta 1", Tribal Voice, 1995, 36 pages.
Goretsky, Aryeh, "PowWow for Microsoft Windows User's Guide Version 2.2 beta 2", Tribal Voice, 1995, 36 pages.
Goretsky, Aryeh, "PowWow for Microsoft Windows User's Guide Version 2.3", Tribal Voice, 1995, 37 pages.
Goretsky, Aryeh, "PowWow for Microsoft Windows User's Guide Version 2.31", Tribal Voice, 1995, 37 pages.
Goretsky, Aryeh, "PowWow for Microsoft Windows User's Guide Version 2.32", Tribal Voice, 1995, 37 pages.
Goretsky, Aryeh, "PowWow for Microsoft Windows User's Guide Version 3.0 beta 3", Tribal Voice, 1995, 48 pages.
Goretsky, Aryeh, "PowWow Quick Installation Guide", Tribal Voice, 1996, 5 pages.
Goretsky, Aryeh, "PowWow User Location Server for Microsoft Windows NT and 95 Version 1.0 beta 2 Installation Guide", Tribal Voice, 1996, 11 pages.

Gralla, Preston, "How the Internet Works: Special Edition", Ziff-Davis Press, 1997, 2 cover pages and pp. 34-37, 202-205, 214-215, and 272-275.
Gulbrandsen, A. et al., "A DNS RR for specifying the location of services (DNS SRV)", Network Working Group, Request for Comments: 2052, Oct. 1996, pp. 1-10.
Harris, Stuart, "The irc Survival Guide: Talk to the World with Internet Relay Chat", Addison-Wesley Publishing Company, Feb. 1995, 209 pages.
Held, Gilbert, "Virtual LANs Become Reality," LAN Magazine, Apr. 1997, pp. 69-70 and 72-74.
Herman, P. et al., "Creating the Virtual Enterprise with VE Gateways," SPIE vol. 2913, Nov. 1996, pp. 174-199.
Hinkley, Adam; "Announcing HOTLINE, a new system for internet communications!" http://groups.google.com/group/comp.sys.mac.comm; Oct. 28, 1996; 1 page.
"Hot Goods on Hotline?", Publish: The Magazine for Electronic Publishing Professionals, "http://web.archive.org/web/19990424171003/www.publish.com/news/9712/news1.html", Dec. 1997, 4 pages.
Hotline Client 1.1 "Read Me" screenshot; Nov. 1996; 1 page.
Hotline Client 1.1b14 "About" screenshot; Nov. 1996; 1 page.
Hotline Client 1.1b14 (68K) "Info" screenshot; Nov. 5, 1996; 1 page.
Hotline Client 1.1b20 "About" screenshot; Feb. 1997; 1 page.
Hotline Client 1.1b20 (PPC) "Info" screenshot; Feb. 1997; 1 page.
"Hotline Client 1.1b20 f/ BETA Release Notes", 1997, 4 pages.
Hotline Client 1.1b20 f/ Hotline FAQ; Feb. 1997; pp. 1-4.
Hotline Client 1.1b20 f/ Read Me; Feb. 1997; 2 pages.
Hotline Client 1.1b21r2 f/ BETA Release Notes; 1997; 7 pages.
"Hotline Client 1.1b21r3 Documentation" Mar. 1997; 12 pages.
Hotline Client 1.2.3 "About" screenshot; Jan. 1998; 1 page.
"Hotline Client 1.2.3 Documentation" Feb. 1998, 14 pages.
"Hotline Client 1.2.3 f PPC /What's New" Nov. 1998, 2 pages.
Hotline Client 1.2.3 PPC "Info" screenshot; Feb. 1998; 1 page.
Hotline Client "Read Me or Crash" screenshot; Jan. 1997; 1 page.
Hotline Client Receipts; Jun. 1997 through Jun. 1998; 8 pages.
"Hotline Communications Private Offering Memorandum", Oct. 21, 1997, pp. 1-40.
Hotline Communications Product Descriptions, 1997, 2 pages.
"Hotline Communications User Question Night Summarized Transcript", Jun. 30, 1997, 3 pages.
"Hotline Idea", email exchange, Jan. 20-21, 1997, 1 page.
Hotline News (Hotline Demo Server (US)) Screenshot; Feb. 27, 1997, 1 page.
Hotline Newsfeed, Mar. 4, 1997 through Jun. 18, 1997, 4 pages.
"Hotline Tracker 1.0.2 f PPC / Release Notes," 1997, 1 page.
"Hotline Tracker 1.1 68K f / What's New," Oct. 21, 1997, 1 page.
"Hotline Tracker 1.1 PPC f / Documentation," 1997, 1 page.
"Hotline Tracker 1.1 Screenshot," Oct. 21, 1997, 3 pages.
The Hotline Users Digest # 7, Jan. 20, 1997; 6 pages.
The Hotline Users Digest # 14, Jan. 28, 1997; 5 pages.
The Hotline Users Digest # 15, Jan. 29, 1997; 3 pages.
The Hotline Users Digest # 25, Feb. 5, 1997; 6 pages.
The Hotline Users Digest # 43, Feb. 18, 1997; 2 pages.
The Hotline Users Digest # 44, Feb. 19, 1997; 2 pages.
The Hotline Users Digest # 45, Feb. 22, 1997; 5 pages.
The Hotline Users Digest # 50, Mar. 5, 1997; 4 pages.
The Hotline Users Digest # 172, May 10, 1997; 4 pages.
The Hotline Users Digest # 188, May 27, 1997; 2 pages.
"ICQ.HLP (1.113)", 1997, 134 pages.
"ICQ.HLP (98a)", 1998, 104 pages.
"ICQ Version 98a—User's Guide; ICQ—Such a good feeling to be among friends!", Mlrabllis Limited, 1998, 409 pages.
IBM, "Connectionless Directory Services", IBM Technical Disclosure Bulletin, vol. 38 No. 12, Dec. 1995, cover page and pp. 481-483.
Ihse, Magnus, "The ICQ Protocol", Version 0.91, Apr. 12, 1998, pp. 1-13.
Info-Mac Archive News and Recent File Summary; newsgroups: comp.sys.mac.digest, comp.sys.mac.misc; Dec. 1, 1996; 1 page.
Info-Mac Digest, vol. 15, Issue 10; Jan. 9, 1997; 3 pages.
Info-Mac Digest, vol. 15, Issue 54; Mar. 3, 1997; 5 pages.
Info-Mac Digest, vol. 15, Issue 61; Mar. 11, 1997; 6 pages.
Info-Mac Digest, vol. 15, Issue 219; Oct. 11, 1997; 4 pages.

Jacobson, V. et al, "TCP Extension for High-Speed Paths", Network Working Group, Request for Comments: 1185, Oct. 1990, pp. 1-21.

Johner, Heinz et al., "Understanding LDAP", IBM Corporation, International Technical Support Organization, Jun. 1998, 193 pages.

Johnson, Brad Curtis, "A Distributed Computing Environment Framework: An OSF Perspective", Open Software Foundation, Inc., Jun. 10, 1991, pp. 1-15.

Kahney, Leander, "Hotline Reinvents the BBS", Wired News, "http://www.wired.com/news/technology/0,1282,15322,00.html", Oct. 1, 1998, 4 pages.

Kapauan, A. A. et al., Wideband Packet Access for Workstations: Integrated Voice/Data/Image Services on the Unix PC, IEEE, 1986, pp. 1439-1441.

Kohl, John T., "Zephyr Installation and Operation Guide", Nov. 20, 1989, pp. 1-7.

Kumar, Anup, et al., "The Virtual Learning Environment System," IEEE, 1988, pp. 711-716.

Landweber, L. et al., "Architecture of the CSNet Name Server", Computer Sciences Department University of Wisconsin—Madison, 1983, pp. 146-153.

Lantz, Keith A., "An Experiment in Integrated Multimedia Conferencing", Department of Computer Science Stanford University, 1986, pp. 267-275.

Lantz, Keith A. et al., "Towards a Universal Directory Service", 4th PODC Conference Proceedings, ACM 1985, pp. 43-53.

Lauwers, J. Chris et al, "Replicated Architectures for Shared Window Systems: A Critique", ACM, 1990, pp. 249-260.

Linton, A. et al., "A Communication System Supporting Large Datagrams on a Local Area Network," Software-Practice and Experience, vol. 16(3), Mar. 1986, pp. 277-289.

Livesey, Jon, "Inter-process Communication and Naming in the Mininet System", IEEE Spring Compcon 79, Feb. 26-Mar. 1, 1979, cover page and pp. 222-229.

The Mac Observer; Mar. 1997 Archive "http://www.macobserver.com/archive/1997march.shtml", Mar. 1997, 2 pages.

"MACWAY Digest 540;" newsgroup: comp.sys.mac.advocacy; Dec. 3, 1996, 2 pages.

"MACWAY Digest 646;" newsgroup: comp.sys.mac.advocacy; Feb. 8, 1997, 2 pages.

"MACWAY Digest 662;" newsgroup: comp.sys.mac.advocacy; Feb. 19, 1997, 4 pages.

Malamud, C. et al., "Principles of Operation for the TPC.INT Subdomain: General Principles and Policy", Network Working Group, Request for Comments: 1530, Oct. 1993, pp. 1-7.

Man, Stan the; "Funky Hotline;" Newsgroup: comp.sys.mac.comm; Dec. 28, 1996; 1 page.

Man, Token White, "PowWow for Microsoft Windows User's Guide Version 1.4B", Tribal Voice, 1995, pp. 1-13.

Martin, James et al., "TCP/IP Networking: Architecture, Administration, and Programming", PTR Prentice Hall, 1994, 2 cover pages and pp. 81-83, 227-237.

"Master Software License, Bundling and Distribution Agreement;" Dec. 9, 1997, pp. 1-14.

Mockapetris, Paul V. et al., "Development of the Domain Name System", Proceedings of SIGCOMM '88, Computer Communication Review vol. 18, No. 4, Aug. 1988, pp. 123-133.

Mockapetris, P., "Domain Names—Concepts and Facilities", Network Working Group, Request for Comments: 1034, Nov. 1987, pp. 1-55.

Mockapetris, P., "Domain Names—Implementation and Specification", Network Working Group, Request for Comments: 1035, Nov. 1987, pp. 1-55.

Mullender, Sape J. et al., "Distributed Match-Making for Processes in Computer Networks: Preliminary Version", 4th PODC Conference Proceedings, 1985, pp. 54-64.

Murphy, David, "Hotline Communications @ Macworld Expo San Francisco;" Jan. 4, 1998; pp. 1-4.

Murphy, David, "Using The Internet Has Never Been Easier—Not to Mention More Fun!" Feb. 18, 1997; 3 pages.

NetBIOS Working Group, "Protocol Standard for a NetBIOS Service on a TCP/UDP Transport: Concepts and Methods" Network Working Group, Request for Comments: 1001, Mar. 1987, 68 pages.

"NetScrawl v1.0 A Picture is Worth a Thousand Words", Hotline Communications, Ltd., 1997, 5 pages.

"NetScrawl v1.0.4 A Picture is Worth a Thousand Words", Hotline Communications, Ltd., 1997, 9 pages.

Nordin, B. et al., "Remote Operations Across a Network of Small Computers", ACM, 1986, pp. 110-114.

Oikarinen, J. et al., "Internet Relay Chat Protocol", Network Working Group, Request for Comments: 1459, May 1993, pp. 1-65.

Oppen, Derek C. et al., "The Clearinghouse: A Decentralized Agent for Locating Named Objects in a Distributed Environment", ACM Transaction on Office Information Systems, vol. 1, No. 3, Jul. 1983, pp. 230-253.

Peterson, Larry L., "A Yellow-Pages Service for a Local-Area Network", Department of Computer Science University of Arizona, 1988, pp. 235-242.

Pickens, John R. et al., "The NIC Name Server—A Datagram Based Information Utility", Jul. 1979, Fourth Berkeley Conference on Distributed Data Management and Computer Networks, 12 pages.

Pioch, Nicolas et al., "A Short IRC Primer", http://www.irchelp.org/irchelp/ircprimer.html, Jan. 1, 1997, pp. 1-33.

Postel, J. et al., "File Transfer Protocol (FTP)", Network Working Group, Request for Comments: 959, Oct. 1985, pp. 1-69.

"PowWow User Local Server Version 1.0 beta 2 Release Notes", Tribal Voice, Jun. 18, 1996, 1 page.

"PowWow User Location Server Version 1.0 beta 2 Technnical Specifications", Tribal Voice, 1996, 2 pages.

"PowWow Version 1.3b User's Guide", Google Groups: comp.os.ms-windows.misc, Apr. 22, 1995, 5 pages.

"PowWow Version 1.4b Release Notes", Tribal Voice, May 24, 1995, 1 page.

"PowWow Version 1.5 Release Notes", Tribal Voice, Jun. 5, 1995, 2 pages.

"PowWow Version 1.6 beta Release Notes", Tribal Voice, Aug. 2, 1995, 3 pages.

"PowWow Version 1.6 beta 2 Release Notes", Tribal Voice, Aug. 3, 1995, 4 pages.

"PowWovv Version 1.7 beta 1 Release Notes", Tribal Voice, Sep. 20, 1995, 5 pages.

"PowWow Version 1.7 beta 2 Release Notes", Tribal Voice, Oct. 19, 1995, 6 pages.

"PowWow Version 1.7 beta 3 Release Notes", Tribal Voice, Oct. 22, 1995, 6 pages.

"PowWow Version 1.7 beta 4 Release Notes", Tribal Voice, Nov. 1, 1995, 6 pages.

"PowWow Version 2.0 beta 2 Release Notes", Tribal Voice, Mar. 4, 1996, 8 pages.

"PowWow Version 2.0 beta 5 Release Notes", Tribal Voice, Feb. 15, 1996, 6 pages.

"PowWow Version 2.1s Release Notes", Tribal Voice, May 13, 1996, 8 pages.

"PowWow Version 2.2 beta 1 Release Notes", Tribal Voice, May 31, 1996, 10 pages.

"PowWow Version 2.2 beta 2 Release Notes", Tribal Voice, Jun. 3, 1996, 10 pages.

"PowWow Version 2.3 Release Notes", Tribal Voice, Jun. 17, 1996, 11 pages.

"PowWow Version 2.31 Release Notes", Tribal Voice, Jun. 25, 1996, 11 pages.

"PowWow Version 2.32 Release Notes", Tribal Voice, Jun. 26, 1996, 12 pages.

"PowWow Version 3.0 beta 3 Release Notes", Tribal Voice, Nov. 21, 1996, 2 pages.

Ramanathan, Srinivas et al., "Integrating Virtual Reality, Tele-Conferencing, and Entertainment Into Multimedia Home Computers," IEEE Transactions on Consumer Electronics, vol. 38, No. 2, May 1992, pp. 70-76.

Ramanathan, Srinivas et al., "Optimal Communication Architectures for Multimedia Conferencing in Distributed Systems", IEEE, 1992, pp. 46-53.

Reed, D., "A Discussion on Computer Network Conferencing", Network Working Group, Request for Comments: 1324, May 1992, pp. 1-11.

Rosenberg, Jonathan et al., "Multimedia Communications for Users," IEEE Communications Magazine, May 1992, pp. 20 and 23-36.

Rosenberg, J. et al., "Wide Area Network Service Location", Internet Engineering Task Force Internet Draft, draft-ietf-svrloc-wasrv-01.txt, Nov. 20, 1997, pp. 1-21.

Saltzer, J., "On the Naming and Binding of Network Destinations", Network Working Group, Request for Comments: 1498, Aug. 1993, pp. 1-10.

Schooler, Eve M. et al., "An Architecture for Multimedia Connection Management", Proceedings IEEE 4th Comsoc International Workshop on Multimedia Communications, Apr. 1992, pp. 271-274.

Schooler, Eve M., "Case Study: Multimedia Conference Control in a Packet-switched Teleconferencing System", Journal of Internetworking: Research and Experience, vol. 4, No. 2, Jun. 1993, pp. 99-120.

Schooler, Eve M., "The Connection Control Protocol: Architecture Overview, Version 1.0", USC/Information Sciences Institute, Jan. 28, 1992, pp. 1-6.

Schooler, Eve M., "The Connection Control Protocol: Specification", USC/Information Sciences Institute, Jan. 29, 1992, pp. 1-29.

Schooler, Eve M., "The Impact of scaling on a multimedia connection architecture", ACM, Multimedia Systems No. vol. 1, 1993, 3 cover pages and pp. 2-9.

Schooler, Eve M., "A Multicast User Directory Service for Synchronous Rendezvous", California Institute of Technology Technical Report CS-TR-96-18 (MS Thesis), Aug. 26, 1996, 73 pages.

Schulzrinne, Henning, "Personal Mobility for Multimedia Services in the Internet", IDMS '96 (European Workshop on Interactive Distributed Multimedia Systems and Services), Mar. 4-6, 1996, pp. 1-18.

Schulzrinne, H. et al, "RTP: A Transport Protocol for Real-Time Applications", Network Working Group, Request for Comments: 1889, Jan. 1996, pp. 1-75.

Sidhu, Gursharan S., et al., "Inside AppleTalk", Second Edition, Addison-Wesley Publishing Company, Inc., May 1990 600 pages.

Silis, Andrew et al., "The DISCWorld Peer-To-Peer Architecture", Technical Report DHPC-028, Jan. 1998, 4 pages.

St. John, Don; "Hotline Client 1.2.3 Faster and simpler file transfers than bulletin boards—or the web;" CNET; http://web.archive.org/web/19990429140019/www.cnet.com/Content/Reviews/JustIn/.. Apr. 13, 1998; 3 pages.

Steiner, Jennifer, "Introduction to OSF DCE: Revision: 1.0", Prentice Hall PTR, 1992, 263 pages.

Sullivan, Eamonn, "TCP/IP protocol stack for Microsoft's Windows for Workgroups holds promise," PC Week, Apr. 11, 1994, pp. 97 and 102.

Tanenbaum, Andrew S., "Computer Networks" 3rd edition, Prentice Hall PTR, 1996, 355 pages.

Terry, Douglas Brian, "Distributed Name Servers: Naming and Caching in Large Distributed Computing Environments", Dissertation submitted in partial satisfaction of the requirements for the degree of Doctor of Philosophy in Computer Science in the Graduate Division of the University of California, Berkeley, Feb. 21, 1985, 218 pages.

Terry, Douglas B., et al.; "The Berkeley Internet Name Domain Server:" USENIX Association: Software Tools Users Group, Summer Conference Salt Lake City 1984 Proceedings, Jun. 12-15, 1984, 2 cover pages and pp. 23-31.

Toyer, Kathryn, "Learn Advanced Internet Relay Chat", Wordware Publishing, Inc., 1998, 280 pages.

Veizades, J et al., "Service Location Protocol", Network Working Group, Request for Comments: 2165, Jun. 1997, pp. 1-72.

Vin, Harrick M., et al., "Hierarchical Conferencing Architectures for Inter-Group Multimedia Collaboration", ACM, 1991, pp. 43-54.

Vin, Harrick M., et al., "Multimedia Conferencing in the Etherphone Environment", Oct. 1991, pp. 69-79.

Vixie, P. et al., "Dynamic Updates in the Domain Name System (DNS Update)", Network Working Group, Request for Comments: 2136, Apr. 1997, 28 pages.

VocalChat, "A low cost solution for: Using your WAN as a voice communication tool", A White Paper from VocalTec, Jun. 3, 1994, 5 pages.

VocalChat, "VocalChat Version 1.0", Readme.txt, Nov. 1993, pp. 1-4.

VocalChat, "VocalChat Version 1.01", Readme.txt, Mar. 1994, pp. 1-3.

VocalChat, "VocalChat 1.01 Network Information", 1993 pp. 1-10.

VocalChat, "VocalChat Version 2.01 & VocalChat WAN Version 2.01", Readme.txt, May 1994, pp. 1-3.

VocalChat, "VocalChat GTI 2.12 beta", 1994, 1 page.

VocalChat, "The VocalChat User', Guide", Vocaltec Inc., 1993, 79 pages.

VocalChat, "Welcome to VocalChat Early Beta Release 1.02B", Release Notes, 1994, pp. 1-2.

VocalTec Ltd., "VocalTec Internet Phone (TM) Version 3.0 (Build 17)", Aug. 11, 1995, pp. 1-4.

VocalTec Ltd., "VocalTec Internet Phone (TM) Version 3.2 (Build 21)", Mar. 25, 1996, pp. 1-5.

Wahl, M. et al., "Lightweight Directory Access Protocol (v3)", Network Working Group, Request for Comments: 2251, Dec. 1997, pp. 1-50.

Weider, C. et al, "A Vision of an Integrated Internet Information Service", Network Working Group, Request for Comments: 1727, Dec. 1994, pp. 1-11.

Whitted, Randy et al., "Technology News", Tech Web, "http://web.archive.org/web/19990427131904/www.techweb.com/wire/news/aug/0802...", Aug. 20, 1997, 3 pages.

Williams, Robert J.; "User Location Service", Microsoft: Internet-Draft, draft-uls-1.txt, Feb. 1996, 11 pages.

Yeong, W. et al., "Lightweight Directory Access Protocol", Network Working Group, Request for Comments: 1777, Mar. 1995, pp. 1-22.

Zellweger, Polle T. et al., "An Overview of the Etherphone System and its Applications", IEEE, 1988, pp. 160-168.

Zephyr, "xzewd—an X interface to zwrite and znol", Nov. 21, 1992, 78 pages.

Zeuge, Klaus, et al., "The Client-To-Client Protocol (CTCP)" Email dated Aug. 12, 1994, 19 pages.

*Peer Communications Corporation vs. Skype Technologies SA, Skype, Inc., and Ebay, Inc.*; Civil Action No. 6 :06CV370 (LED); Final Judgement (2 pages) dated Oct. 7, 2008.

*Peer Communications Corporation vs. Skype Technologies SA, Skype, Inc., and Ebay, Inc.* on Appeal No. 2009-1069 in the U.S. Court of Appeals for the Federal Circuit from Civil Action No. 6 :06CV370 in the U.S. District Court for the Eastern District of Texas; Judgment (2 pages) dated Oct. 6, 2009.

* cited by examiner

NETWORK AGENT FUNCTIONS

UNIFORM NETWORK ACCESS

CROSS-REFERENCE TO RELATED APPLICATIONS

The present application is a continuation of U.S. patent application Ser. No. 10/361,920, filed Feb. 10, 2003 now U.S. Pat. No. 6,961,748, which application is a continuation-in-part of U.S. patent application Ser. No. 09/310,411 filed May 12, 1999 (issued as U.S. Pat. No. 6,519,625), which claimed the benefit of U.S. Provisional Patent Application Ser. No. 60/105,858 filed Oct. 27, 1998. The entire contents of those applications are incorporated herein by reference.

BACKGROUND

Communications networks, including the Internet, have been used to access resources located on various network access devices. Typically, a user may transfer data files, including text, application files, voice and video with electronic network access devices. As the size and complexity of available communications networks has increased, methods of conveniently transferring data across various software platforms have been sought.

In order to deliver a message to an agent via an electronic communications network, it is necessary to address the computer and the application software accessed by the agent. Typically, an Internet Protocol (IP) address is used to identify the computer. Application software is commonly addressed to a port number on the computer. A computer may have thousands of ports available. Each port can connect to only one application. However, an application may connect to multiple ports. A combination of the IP address and port number allows a message to be delivered properly to a designated application program. In this way, an Internet message is first delivered to an IP address associated with a computer and then delivered to the specific port on the computer running application software associated with the message.

Fixed IP addresses are not widely available to independent users. It is common for domestic and small business users to access a network such as the Internet via an Internet Service Provider (ISP). ISPs can act as a redirecting service and assign a temporary IP address to a computer contacting the service provider. The temporary IP address is used by that computer during one contiguous computing session. When a computing session ends, the ISP, or other redirecting service, makes a previously allocated computer address available to a subsequent request to initiate an Internet computing session. An address is consistent for a user during any continuous computing session.

Similarly, port numbers are not commonly allocated on a fixed basis. On a shared processor, such as a mainframe, shared port numbers are allocated to application programs as various users invoke the applications. On single user machines such as PCs, all port numbers are available to a user. However, multiple instances of an application program may be enabled for concurrent execution. Each instance must be assigned a unique port Ports are therefore assigned on an as-requested basis.

Due to the allocation and re-allocation of IP addresses and port numbers with each new computing session, it is difficult for a user to track the address of another party with which the user may wish to communicate. Without an address, it is difficult to communicate directly across a network.

In response to the problem of changing addresses, systems have been implemented using centralized servers that maintains permanent IP address and port number. Often, specially designated programs may be allocated a port number for that special program's permanent exclusive use. In this way, an agent can locate the centralized server and communicate with it. If appropriate, the centralized server can forward a message to another agent who has also identified itself to the communications server. The centralized server acts as a hub for all communication. However, if the centralized server or a communications link to the server should fail, all communications cease.

In addition, permanent address centralized servers typically require set up and maintenance by technical personnel. Applications running on the servers, such as an email or database application, may require a particular computing platform to execute the application software. With the proliferation of computing platforms such as Microsoft Windows, Unix, DOS, and IBM OS2, it becomes increasingly difficult to support multiple platforms.

Multiple services in the form of resources and applications can be available on a network. Typically, a discrete service requires a unique access interface. In addition, different operating systems are often manifested in different interfaces.

It would be useful therefore to have a method of communicating that does not require a centralized server and is executable across multiple platforms.

SUMMARY

A uniform network access mechanism, or interface, can enable a network agent to access multiple discrete network services; the uniform network access mechanism can include software operative on multiple operating systems and executed on a network access device. In one aspect, groups of loosely interconnected agents can communicate contemporaneously or at various times without intermediaries such as servers.

Communications can include text, voice, files and database access. Agents can include human users utilizing network access devices, such as a personal computer, or robot machines that are programmed to respond like humans. In another aspect, agents operating on different operating system platforms can use an equivalent interface.

The operating systems can include the Disk Operating System (DOS)™, Windows 95™, Windows NT™, UNIX, Apple Mac OS, or other operating systems. The software can display a registry of discrete services available on a network and implement communication with a discrete resource listed on the registry as available.

In general, in one aspect, a discrete resource is identified with a Personal Network (PeN) address comprising an Internet Protocol address and a port number. In another aspect, the software can be additionally operative to coordinate the sending and receipt of data packets. A data packet can be received and parsed wherein an action responsive to the content of a received packet can be performed.

In general, one response to packet content can construct a network socket with associated input and output streams and add it as a triplet to a multiplexer IOStreamList A multiplexer can coordinate multiple communications to a discrete service available on the network.

In another aspect, in general, a discrete service can include a database query, a mail message, a chat message or a file transfer request. A communication or other data stream can also be encrypted to provide security against unauthorized access.

In general, in another aspect, the invention includes a uniform user interface invocable by a command on a network access device. The user interface can include a first display region for a registry to list available network agents and resources. In a second display region, a log of communication events occurring between resources and agents can e displayed. A third display region can include user interactive controls to perform registry functions. A fourth display region can list available network functions and user interactive controls to enable or disable said network functions. In still another aspect, a PeN virtual network can coordinate network access devices linked by a communications network. Software running on a network access device can create a registry coordinating PeN resources, the registry can list unique PeN addresses for each resource and facilitate communications directly between network access devices.

DETAILED DESCRIPTION

Figure 1:
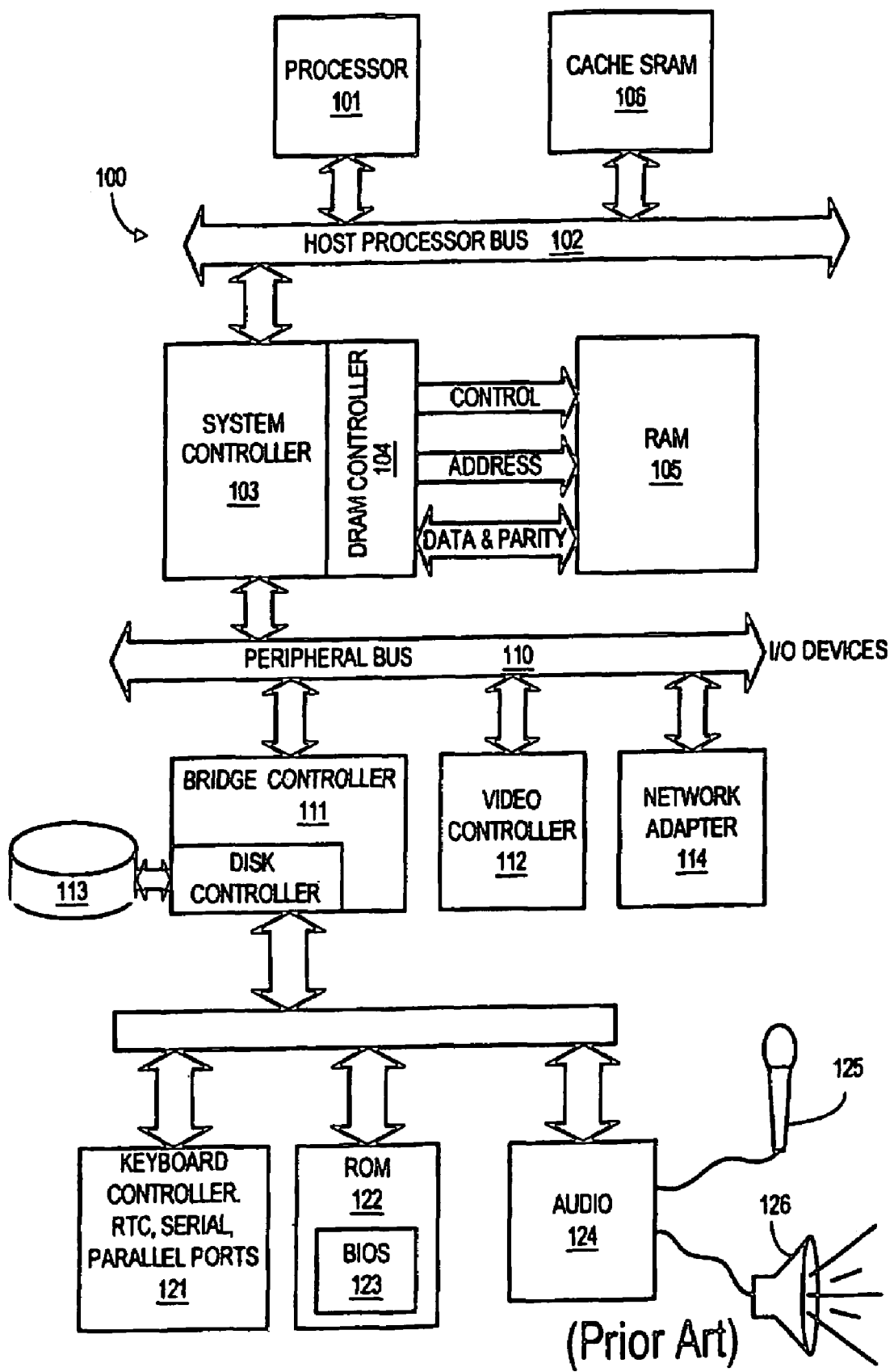
FIG. 1 illustrates a computer.

FIG. 1 depicts physical resources of a computer 100. The computer 100 has a processor 101, such as a Central Processing Unit (CPU) connected to a processor host bus 102 over which it provides data, address and control signals. The processor 101 may be any conventional, general purpose, single- or multi-chip microprocessor such as a Pentium® processor, a Pentium® Pro processor, a Pentium II® processor, a MIPS® processor, a Power PC® processor or an ALPHA® processor. In addition, the processor 101 may be any conventional special purpose microprocessor such as a digital signal processor or a graphics processor. The processor 101 has conventional address, data and control lines coupling it to the processor host bus 102.

The computer 100 includes a system controller 103 having, an integrated RAM memory controller 104. The system controller 103 can be connected to the processor host bus 102 and provide an interface to Random Access Memory (RAM) 105. The system controller 103 can also provide a host bus to peripheral bus bridging functions. The system controller 103 can thereby permit signals on the processor host bus 102 to be compatibly exchanged with signals on a peripheral bus 110. The peripheral bus 110 may be, for example, a Peripheral Component Interconnect (PCI) bus, an Industry Standard Architecture (ISA) bus or a MicroChannel bus. Additionally, the system controller 103 can provide data buffering, and data transfer rate matching, between the host processor bus 102 and peripheral bus 110. The system controller 103 can thereby allow, for example, a processor 101 having a 64-bit 66 MHz interface and a 533 Mbytes/second data transfer rate to interface to a PCI bus 110 having a data path differing in data path bit width, clock speed, or data transfer rate.

Accessory devices including, for example, a video controller 112 and network adapter 114 can be coupled to the peripheral bus 110. The network adapter 114 may be a modem, an Ethernet networking card, a cable modem or other network access circuitry.

The computer 100 can also include nonvolatile Read Only Memory (ROM) 122 to store basic computer software routines. An operating system boot operation can occur after the computer 100 is turned on and power-on self-test (POST) routines stored in the BIOS 123 complete execution. During the boot process, the processor 101 executes BIOS 123 software to access a bridge controller 111 (e.g., including a disk controller) or network adapter 114 and thereby obtain a high-level operating system. The high-level operating system may be. for example, the Disk Operating, System (DOS)™, Windows 95™, Windows NT™, UNIX, Apple Mac OS™ or other operating systems.

An operating system may be fully loaded in the RAM memory 105 or may include portions in RAM memory 105, disk drive storage 113, or storage at a network location. An operating system, such as Windows 95™ or Windows NT™, provides functionality to control computer peripherals, such as devices 112-114, 121, and 124, and to execute user applications. User applications may be commercially available software programs such as personal network software, word processing, spreadsheets, Internet access software and many other types of software. User applications may access computer system peripherals 112-114 through an Application Programming Interface (API) provided by the operating system and/or may directly interact with underlying computer system 100 hardware.

Figure 2:
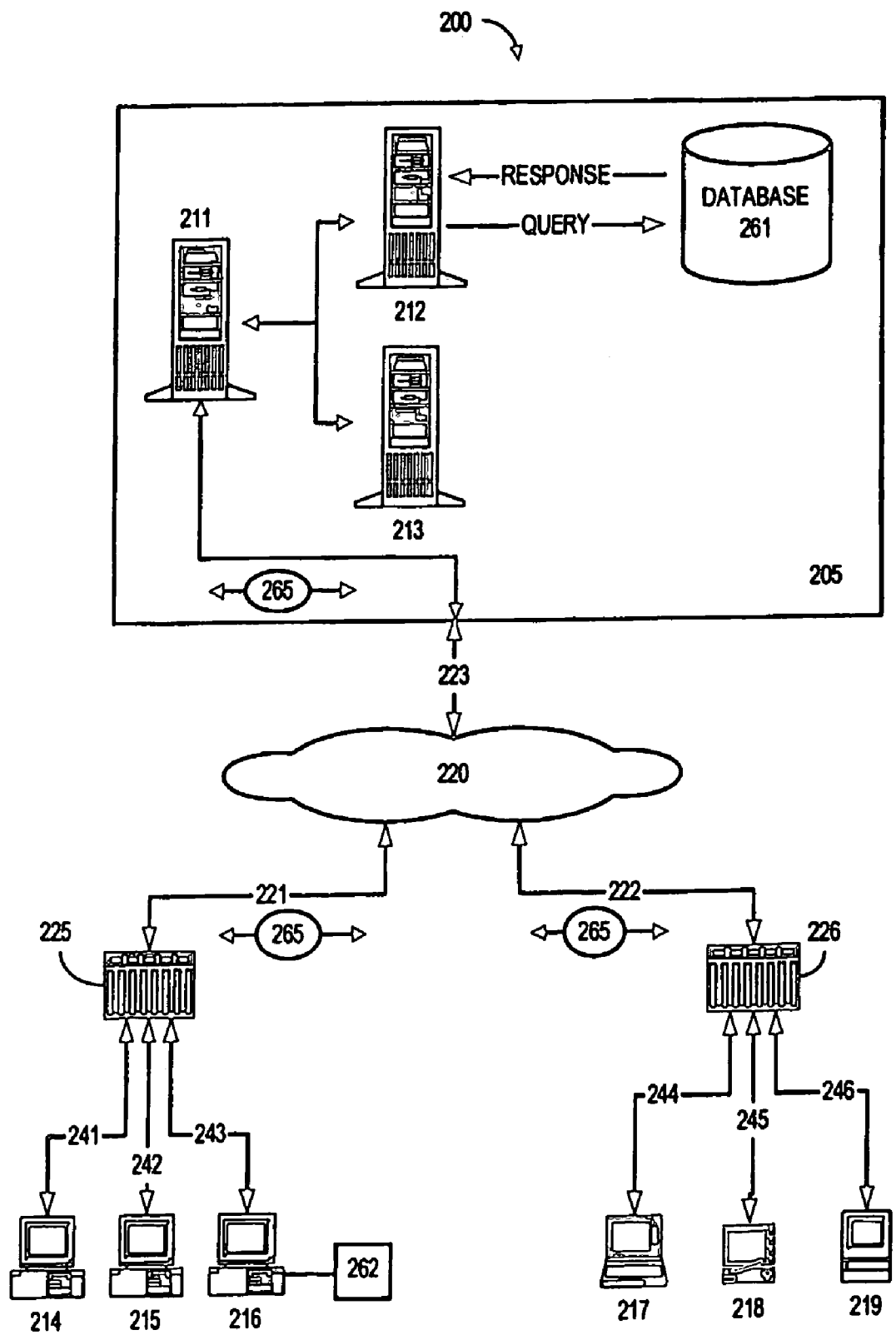
FIG. 2 illustrates a communications network.

A collection of computers 100 can serve as components of a communications network. Referring to FIG. 2, a communications network 200 can include network access devices such as client computers 211-213 that are part of a local area network 205, independent computers 214-216 and other network access devices 217-219. Other network access devices can include, for example, cellular communications devices, interactive WEB devices, portable handheld devices or any device that provides communication on an electronic communication network such as the Internet.

A network agent can include a person or machine seeking to communicate over the communications network 200. Agents can communicate via a network access device 211-219. Network communication can be accomplished over a medium such as a combination of public switched telephone network dial-up connections and packet network interconnections. Network access devices 211-219 can connect through dial-up, direct cable access, wireless technologies, satellite or other communications media. A terminal server 225 or 226 may have both dial-up and packet network interfaces allowing the server 225 or 226 to receive data from network access devices 214-216 and 217-219, respectively, segment the received data into data packet segments, add overhead information to the segments, and send the resultant data packets over a link 221 to a packet data network 220 for delivery to the local area network 205. Terminal servers 225 and 226 may also be referred to as a network service provider's Point-Of-Presence (POP). A registry 262 can reside on any network access device 211-219 to list and coordinate resources available on the network.

Software code operative with a processor on a network access device 211-219 can provide a personal network (PeN) with a uniform network access mechanism, such as a Uniform User Interface (UUI), to access local resources or resources available via the communications network 200. The UUI an be used across multiple software platforms and access device types to facilitate sharing resources and sending and receiving data. Establishing and maintaining a communications link between two or more network access devices 211-219 enables a UUI to manage data queries, messaging, chat and other application requests. Utilization of a multi-platform software language, such as the Java programming language, allows the UUI to present a universal interface to a user. The universal interface frees a user from having to learn a different interface for each operating system such as DOS™, Windows 95™, Windows NT™, UNIX™, Apple Mac OS™ or other operating systems.

A UUI can operate directly on a network access device 211-219 to eliminate the need for a specialized server dedicated to performing communications functions. Communications can be established directly between participating network access devices 211-219. Each network access device 211-219 can specify the extent to which it will make its resources available and participate in activities such as network chat and messaging.

Figure 4:
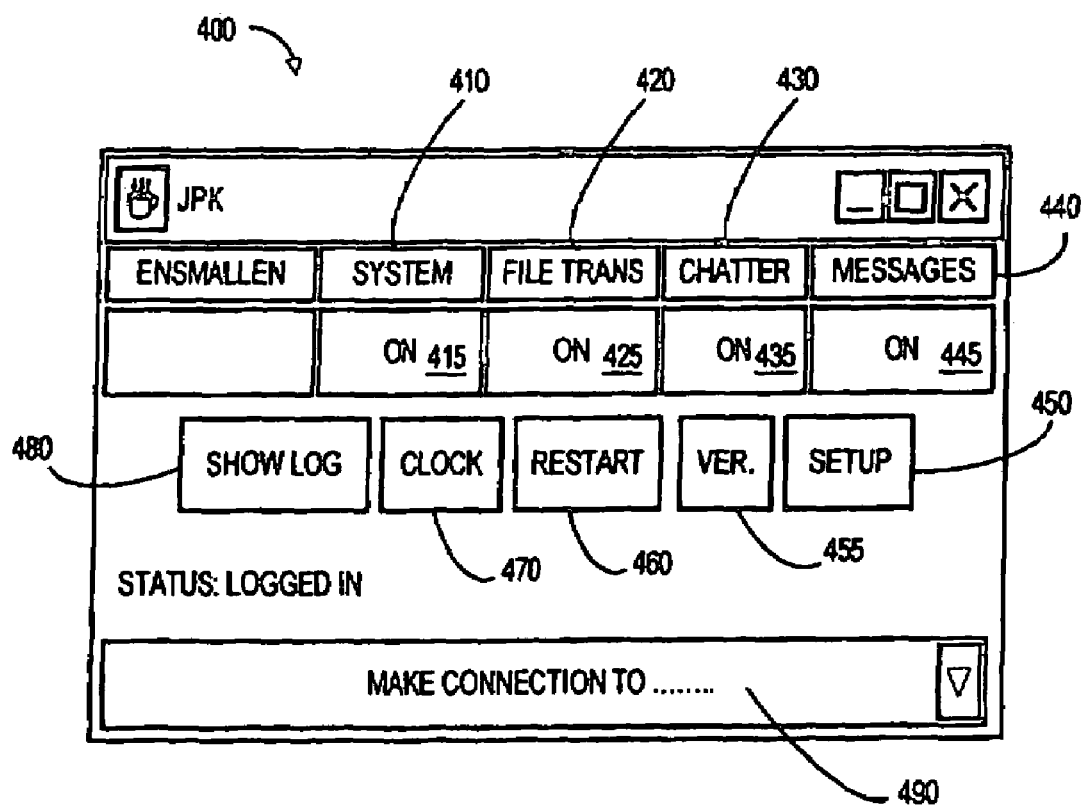
FIG. 4 shows a Uniform User Interface.

Referring now to FIG. 4, program code can be executed on a network access device 211-219 to present a UUI 400 to an agent. The UUI 400 can include user interactive controls, such as a push button icons, to facilitate operation of PeN functions. PeN functions can include system application programs 410, file transfer 420, chat sessions 430, messaging 440 or other discrete services. User interactive controls can also be utilized to offer UUI 400 specific functions such as displaying a log 480, displaying a clock 470, re-starting a PeN session 460, displaying a software version 455 or entering a setup utility 450. In addition, the UUI 400 can include user interactive controls for PeN functions. For example, a button may be used to enable or disable system application programs 415, file transfer 420, chat sessions 435 and messaging 445. Restarting a session can include an automated download of a new version of PeN and running the new version with minimal intrusion to the user.

Figure 3:
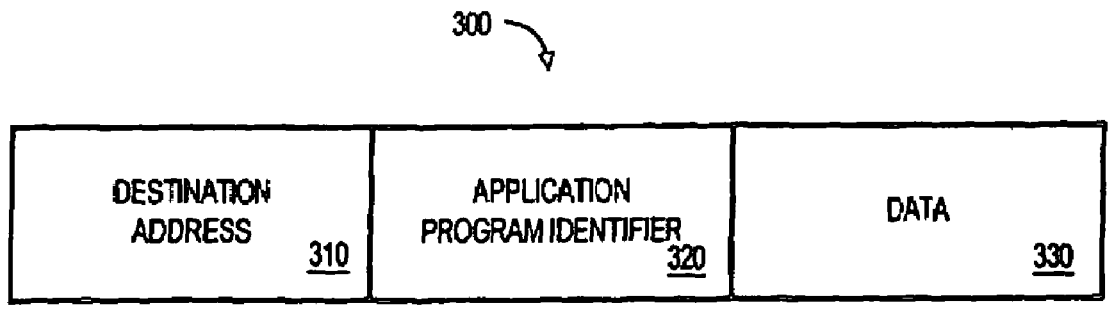
FIG. 3 illustrates a PeN address.

A UUI can also include a drop down menu 490 of resources available on the PeN or locally on the network access device 211-219. A resource available on the PeN can be accessed by choosing it from a resource drop down menu 490 or by specifying a destination PeN address. A PeN address identifies the location at which a resource can be located. In one embodiment, as illustrated in FIG. 3, a PeN address can include a destination address 310 concatenated with an application program identifier 320. The destination address 310 can be a network address such as an IP address specifying a network access device 211-219 on which a resource is being made available. The application program identifier 320 can be a port number associated with an application program administering the resource.

To commence communications, the UUI 400 can poll a network 200 to determine whether a network access device 211-219 with which an originating agent wishes to communicate is available. Polling can be accomplished, for instance, with a ping of an IP address portion of a PeN address. A successful ping can signify that a corresponding resource is online and available.

Figure 5:
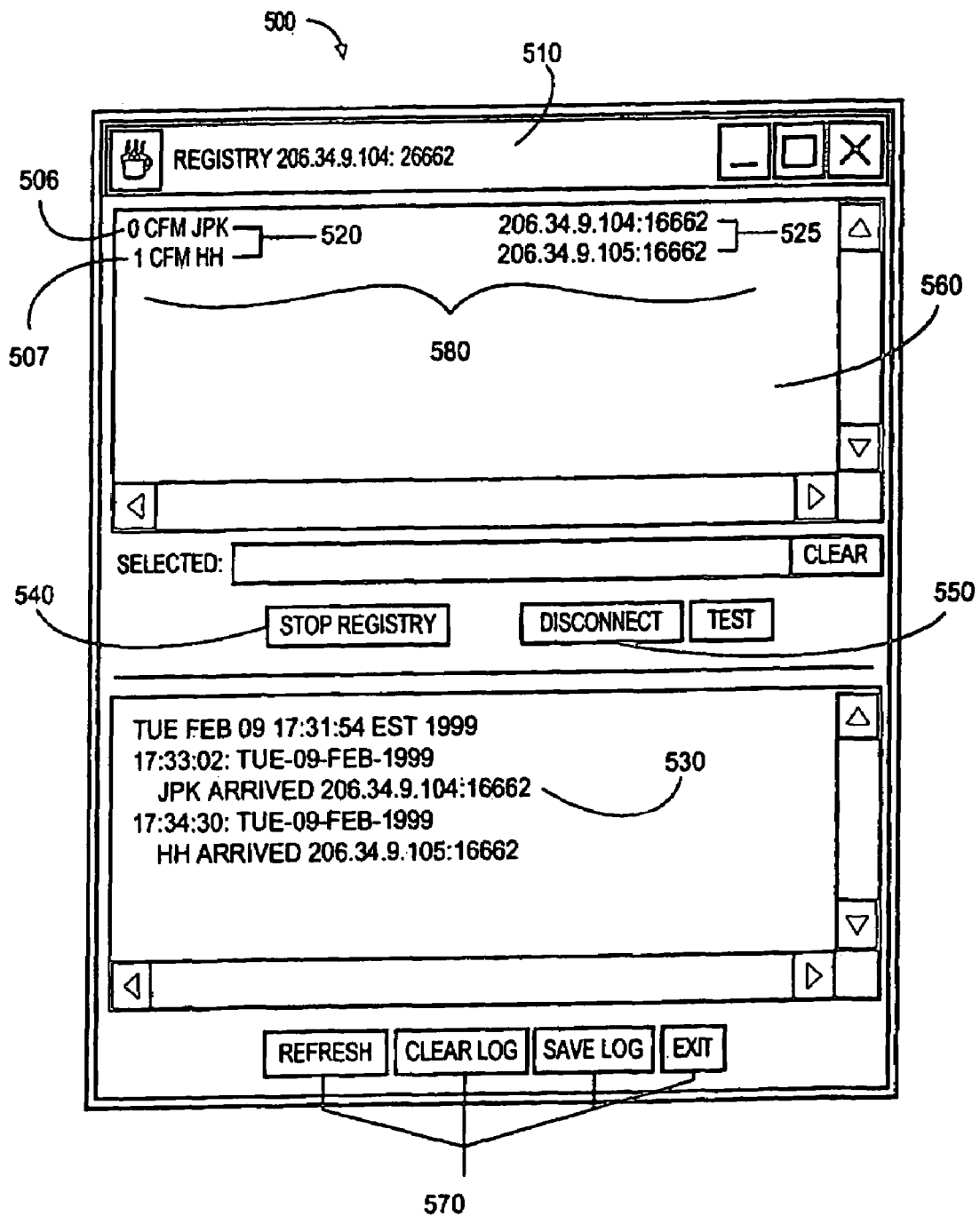
FIG. 5 shows a PeN Registry.

Referring now to FIG. 5, PeN addresses maintained in a registry 262 can be displayed in an interface 500 to facilitate location of various agents 506 and resources 507. A registry 262 can include a name 520 or other identifier for each resource listed, and a PeN address 525 at which the identified resource can be communicated with. A PeN utilizing a registry 262 enables communication amongst the addresses 525 listed. In one embodiment, a menu 560 can be presented listing available resources 580. Selection of a resource 580 from the registry can automatically open a communication session with that resource 580. A PeN can include one or more available agents 506. In a multi-agent PeN, communication can be directed to an individual destination or to multiple destinations. In addition, an agent can participate in more than one PeN simultaneously.

The interface 500 can include an identifier 510. In one embodiment, the identifier can be indicative of the network access device 211-219 hosting the registry 262. Other embodiments can include a description of the agents 506 and resources 507 listed, or an arbitrary name. A registry interface 500 can include a region displaying user interactive controls such as push buttons 570. Push buttons 570 can actuate registry functions such as refresh the display, clear the log, save the log and exit.

Human agents, robotic agents, and other resources utilizing a PeN registry 262 can be identified by multiple identification data, including a short "user-name" to uniquely identify a user to a registry; an optional password that can enable a registry to verify a user's identity; a user's full name, location, affiliations and/or other details provided by the user; or an optional digital portrait or other digital image of the user.

Identification data items can be made available to users of the registry 262, whereby correspondents may be identified by their real names and likenesses, obviating the need to memorize user-names or email addresses.

A network access device 211-219 hosting a registry 262 may poll agents 506 and resources 507 listed on the registry periodically and update the availability of the agents 506 and resources 507 listed according to the results of the poll. For example, a network access device 211-219 may publish a registry 262 that allows agents 506 to log in and declare an address 525 at which they can be reached. In addition, the registry 262 may list other resources 507, such as a database or file library. A poll may consist of a ping on a periodic basis to ascertain the continued presence of an agent 506 or resource 507. In addition, a network access device 211-219 can ping a registry on a periodic or other basis. A successful ping will certify that the registry is accurate.

In one embodiment, a network access device 211-219 with a permanent PeN address 525 maintains a registry 262 allowing other agents 506 listed in the registry 262 to declare their current PeN address 525 as an agent 506 becomes available online. The permanent address of the network access device 211-219 maintaining the PeN can act as a known origination point for the PeN.

In other instances, a network access device 211-219 with a permanent address may not be available, and a network access device 211-219 with a temporary PeN address 525 will publish a registry 262. The temporary address 525 needs to be conveyed to an agent 506 seeking to log into the registry 262. A temporary PeN address 525 can be considered via email, telephone. bulletin board or other communications method. Moreover, a temporary address might be, for example, allocated by the Dynamic Host Configuration Protocol (DHCP) mechanism.

In one embodiment, multiple network access devices 211-219 included in a PeN will host a registry 262 concurrently. One of the registries 262 can be active and coordinate the communications. However, messaging or other PeN functions do not flow through the registry. The registry simply coordinates network access devices 211-219 and PeN resources. In the event the network access device 211-219 hosting the active registry 262 drops out, another registry 262 can automatically become active. In addition, an active registry 262 can proactively transfer the active status to another registry 262.

Figure 6:
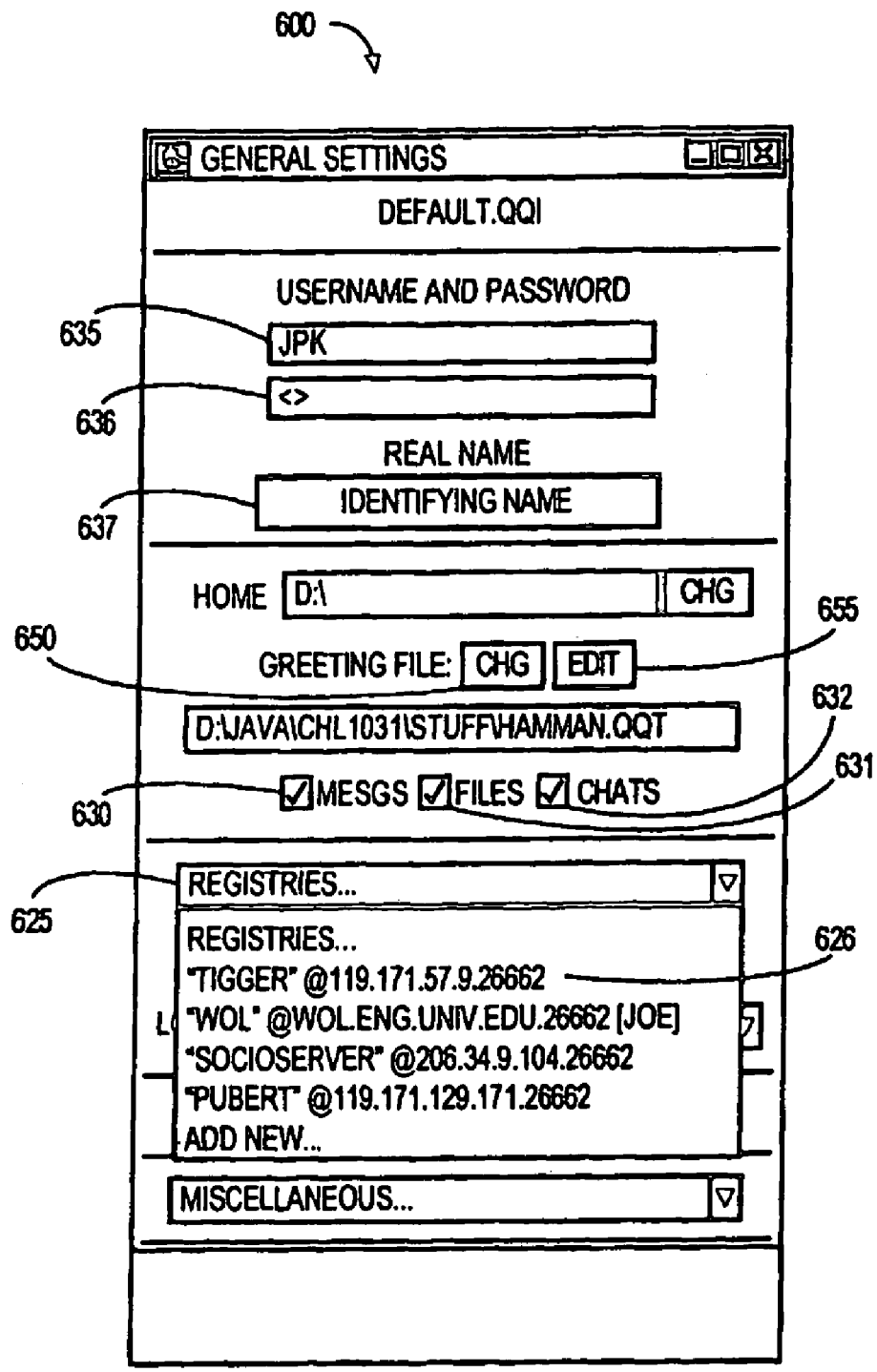
FIG. 6 shows a PeN General Settings display.

Referring now to FIG. 6, a General Settings display 600 can display PeN information. The General Settings 600 can include the user-name of an agent 635, a password 636 and an actual name 637. The General Settings 600 can also include user interactive controls such as check boxes to enable PeN functions such as messaging 630, file transfer 631 and chat sessions 632. In addition, a drop down menu or other listing of available registries 625 can be included. Selecting a registry by clicking on a listed registry 626 can log an agent into the selected registry 626. A function to change 650 or edit 655 a greeting presented to an agent loc into a PeN registry can also be included in the General Settings 600.

Figure 7:
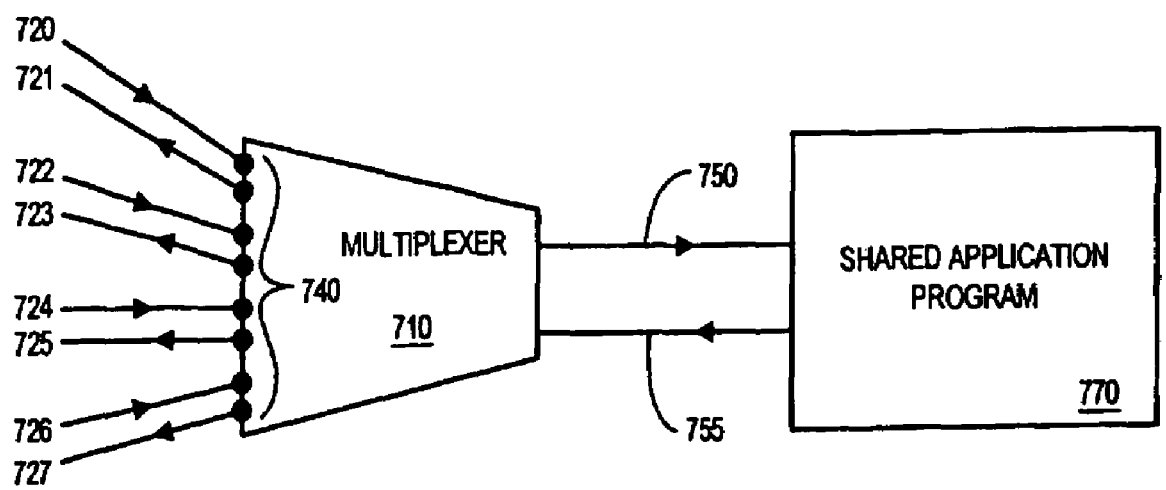
FIG. 7 illustrates a PeN multiplexer.

Referring now to FIG. 7, a network access device 211-219 making a resource such as a database, chat session or other shared application 770 available to access by other agents 506 can accommodate multiple concurrent access with a resource sharing mechanism such as a multiplexer 710.

A multiplexer 710 can manage multiple streams 720-727 of data being received and sent. Each data stream 720-727 is conveyed via a communications link such as an Internet socket 740. A data stream 720-727 can include one or more data packets 265 received from a network agent. A packet 265 is collected from an input stream 720, 722, 724 or 726, as it is received and transferred to a single input line 750 of communication providing input to a shared application 770. Responses from the shared application 770 are directed back on an output stream 755 through the multiplexer 710 to an output stream 721, 723, 725, 727 connected to the original Internet socket 740 from which it was received.

One embodiment of a multiplexer 710 utilizes a software program, such as a Network Agent software program, to initiate new corrections, construct a network socket 740 with associated input and output streams 720-727, and connect them as a triplet to a multiplexer IOStreamList 720-727. The multiplexer 710 can continuously scan the list. A communication received from the input stream on this list is transmitted to the shared resource. Responses are transmitted on an associated output stream. When a session is terminated, the multiplexer 710 closes the associated socket and removes its triplet from the list. A typical programming loop for a multiplexer is illustrated in Table 1.

TABLE I

Main Loop:
1. While message queue from application is not empty:
   A. remove response and tag from queue,
   B. identify output stream corresponding to tag,
   C. transmit response on that output stream, and
   D. discard response and tag.
2. When message queue from application is empty: Start scanning IOStreamList from beginning.
   For each triplet:
   A. While inputstream is not empty:
     I. receive input from inputstream;
     II. if input is request to terminate:
       a. close corresponding socket,
       b. remove triplet from IOStreamList;
     III. otherwise (not a request to terminate):
       a. generate tag identifying this triplet.
       b. send input and tag on message queue to application.
   B. When inputstream is empty
     Move on to next triplet when at end of IOStreamList.

Figure 8:
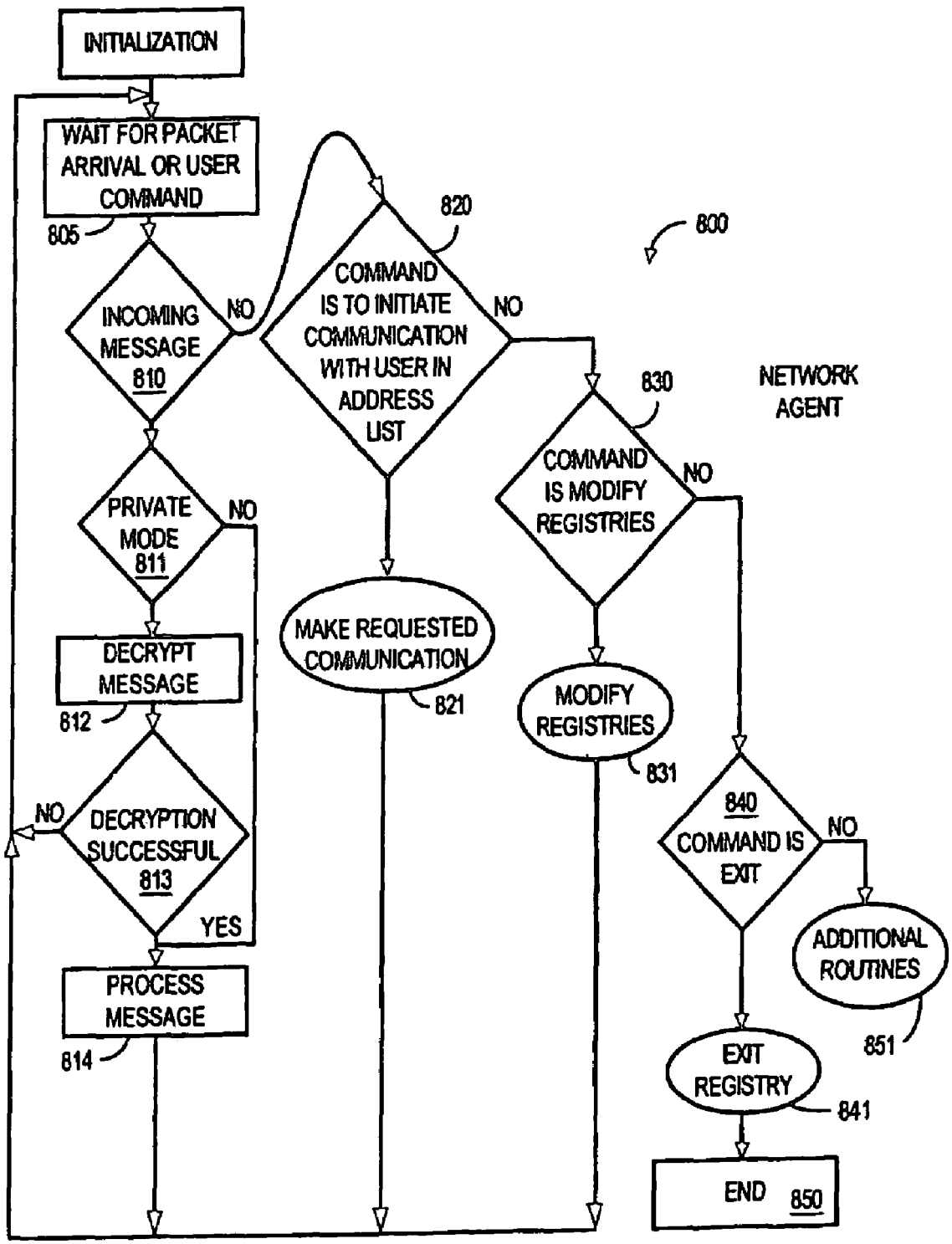
FIG. 8 illustrates an exemplary program flow for a network agent.

Referring now to FIG. 8, a flow diagram 800 illustrates one embodiment of a process for receipt of a data packet 265 by a network access device 211-219. An agent can wait for a packet arrival or user command 805. If a packet is received it can be tested 810 to determine if it is a message. If it is a message, the message can be tested for private mode 811 indicating encryption. If the message is received encrypted, it can be decrypted 812 and processed 814. Processing can include displaying the content of the message or other action indicated by the message. If the input is a user command, it can be tested to determine if it is a command to initiate communication with an agent 506 listed in the registry address list 820. If it is, the communication requested can be made 821. If the input is not a command to initiate communication 820, it can be tested to see if it is a command to modify the registry 830. If it is a command to modify, the registry 830, the registry can be modified accordingly 831. If it is not, the packet 265 can be tested for a command to exit 840 or proceed to additional routines 851. Data packets 265 can also include email. A network agent can additionally be programmed to receive, send, store, archive and otherwise participate in email.

Figure 9:
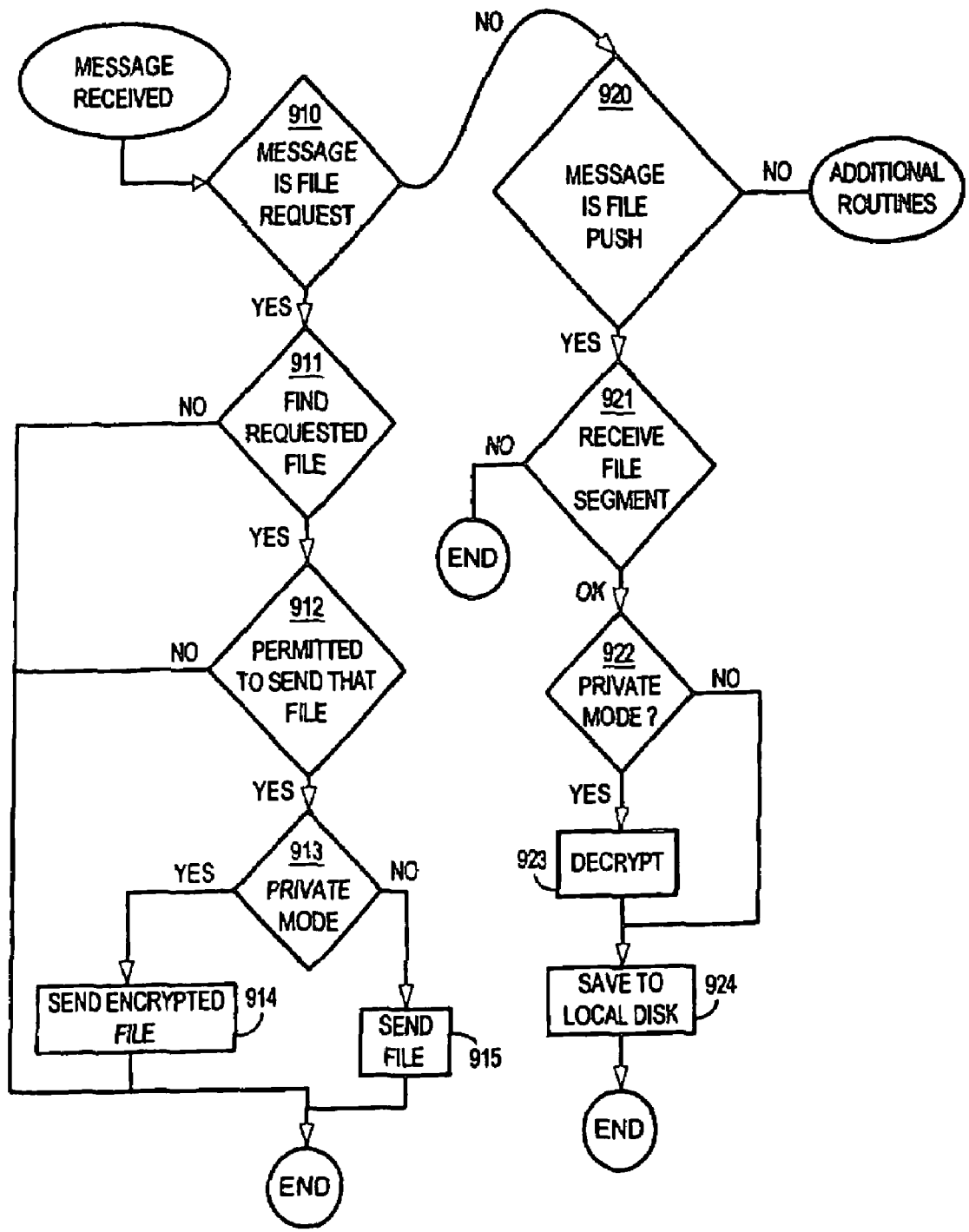
FIG. 9 illustrates an exemplary program flow for network functions.

Referring to FIG. 9, a file request 910 received by an agent can be responded to with a search for the file 911, a test for permission to send a particular file found to the requestor 912, a check to see if encryption is appropriate 913, and if all conditions are met, sending the file to the requester 914 or 915. In response to a request to push a file 920, the file can be received 921 and tested for private mode indicating encryption 922. If appropriate, it can be decrypted 923 and saved to local disk 924.

Figure 10:
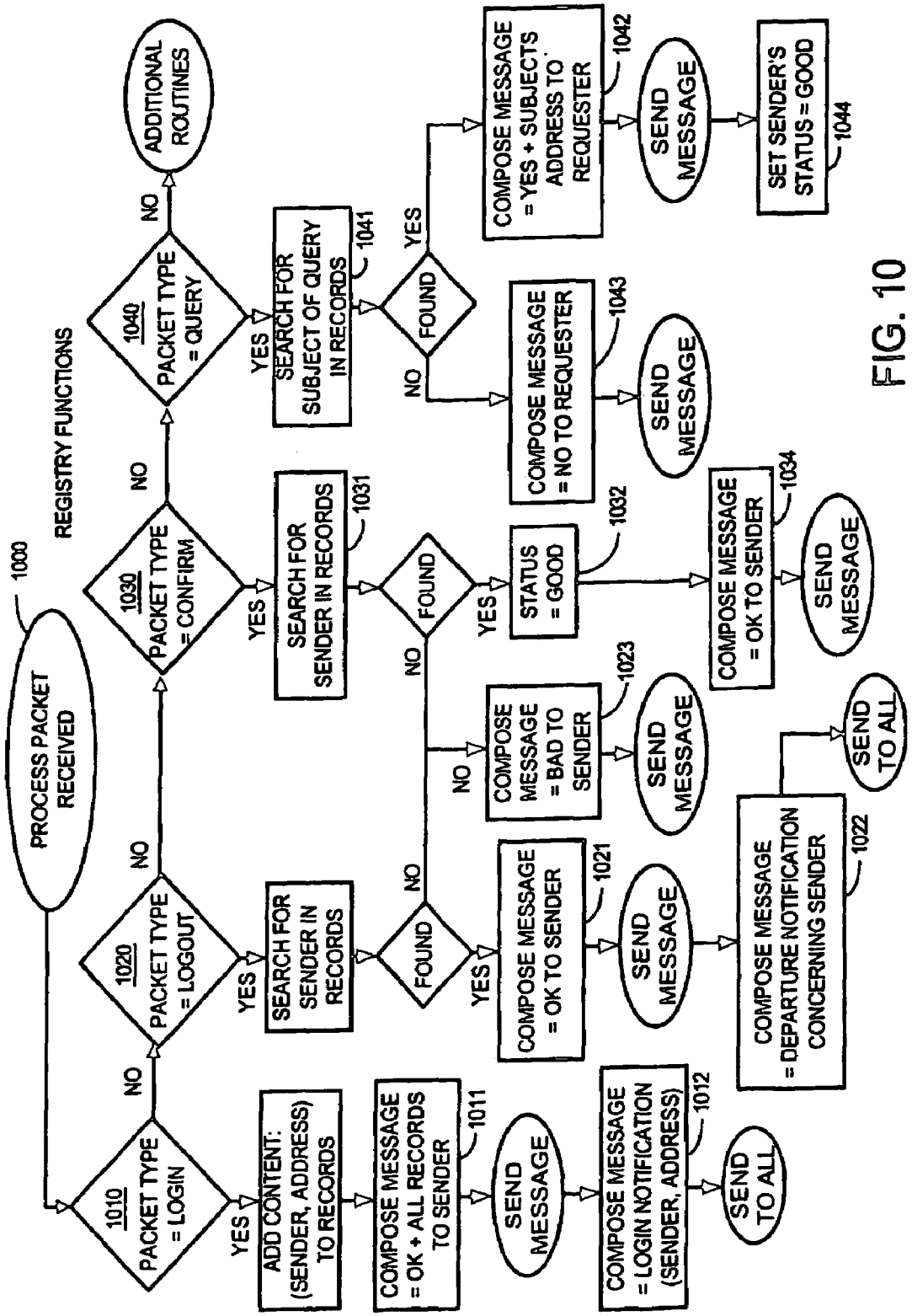
FIG. 10 illustrates an exemplary program flow for registry functions.

Referring now to FIG. 10, which illustrates functions of a registry for processing a packet requesting login 1010, logout 1020, confirmation 1030 or database query 1040. A login request 1010 may receive a response of an OK message and a list of records representing all agents logged in 1011. A logout request may be responded to with an OK message back to sender 1021 and a notification to all other agents 1022. A confirmation request 1030 may receive a search 1031, a status set equal to good 1032 and an OK message back to the sender 1034. A database query request 1040 response may be a query search 1041 and a positive response 1042 or negative response 1043 sent back to the requester. A completed transaction can also be used to confirm a senders status as good 1044.

The above flow illustrations are exemplary and should not be viewed as limiting. Data packet 265 formats, switching equipment within the packet network 220, and networking protocols used within the network 200 may conform to the transaction control protocol/Internet protocol (TCP/IP). In a TCP/IP implementation, the local area network 205, packet network 220, and terminal servers 225, 226 can each be assigned a unique IP network address. Implementations may use other networking protocols and packet formats.

The present invention may be implemented in digital electronic circuitry, or in computer hardware, firmware, software, or in combinations thereof. Apparatus of the invention may be implemented in a computer program product tangibly embodied in a machine-readable storage device for execution by a programmable processor; and method steps of the invention may be performed by a programmable processor executing a program of instructions to perform functions of the invention by operating on input data and generating output. Note that the computer program might be transmitted from a server to a user device (e.g., his or her PC) and then locally stored and executed.

The invention may advantageously be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object oriented programming language, or in assembly or machine language if desired; and, in any case, the language may be a compiled or interpreted language. Suitable processors include, by way of example, both general and special purpose microprocessors. Generally, a processor will receive instructions and data from a ROM and/or a RAM. Storage devices suitable for tangibly embodying computer program instructions and data include all forms of non-volatile memory, including, by way of example, semiconductor memory devices, such as EPROM and flash memory devices, magnetic disks such as internal hard disks and removable disks, magneto-optical disks; and CD-ROM disks. Any of the foregoing, may be supplemented by, or incorporated in, specially-designed Application Specific Integrated Circuits (ASICs).

A number of embodiments of the present invention have been described. Nevertheless, it will be understood that various modifications may be made without departing from the spirit and scope of the invention. For example, various application programs can be accessed as resources by a network access device 211-219, or a network access device 211-219 may be a receive only device. Commands can be forwarded to a receive only device to control a function of the device, however, no response is received back from a receive only device.

According to some other embodiments, the resource that is shared in a peer-to-peer fashion is an interface application that is controlled by (or communicating with) a human user or an automated process. For example, an automated process might use artificial intelligence techniques to simulate human operators, such as to provide basic customer service when no human representatives are available (e.g., technical support) or acting on the behalf of a human user to transact business.

Moreover, the resource may provide controlled or uncontrolled access to traditional software applications, such as database systems, spread-sheets, and search engines. For example, the resource might valid a user name and/or password before letting that user access information.

According to one embodiment, the resource is associated with a common depository of messages from a plurality of other agents, creating a "bulletin-board" service.

According to still other embodiments, the resource is associated with a remote shopping service, guiding users through a collection of commercial wares (e.g., products and services). For example, users might receive graphical representations, descriptions, pricing information, and other information about products and services. Moreover, the resource might facilitate a sale of such items to a user.

According to yet other embodiments, the resource lets human users at remote locations communicate in various ways, including typed words, speech, pictures, and transmitted files. In this case, the resource might store a historic record of previous interactions with the same correspondent or correspondents, such that each new message appears in its proper conversational context. In this way, a consistent record of an entire long-term interaction might be created (e.g., including text, graphical elements, and/or file transfers). Moreover, the historical record might contain time-stamps indicating when each transaction was sent and/or received. In addition, the record might use encryption and other techniques to ensure that it is a complete and accurate record (e.g., to prevent unauthorized tampering). According to another embodiment, users might be allowed to modify the historical record (e.g., to provide a mechanism for collaborative writing).

In another embodiment, the resources are intermediary applications, receiving transmissions from a plurality of other resources and forwarding them unmodified to corresponding other resources, providing a controlled bridge or access point suitable for crossing firewalls.

Transmissions between resources may be encrypted, digitally signed, or subject to other security measures.

What is claimed:

1. A method performed by a network access device including a processor for use in communications, comprising:
    displaying, in a user interface, indications of a plurality of resources available on a network, each of the resources having an associated Internet Protocol address and port number;
    receiving a command to initiate communications with a selected resource, the selected resource being at least one of the plurality of resources;
    obtaining the associated Internet Protocol address and port number of the selected resource from a registry residing on the network access device; and
    establishing a connection over the network between the network access device and the selected resource using the associated Internet Protocol address and the port number of the selected resource.

2. The method of claim 1, wherein the indications of the plurality of resources include names of users associated with the plurality of resources.

3. The method of claim 1, wherein the indications of the plurality of resources include digital images of users associated with the plurality of resources.

4. The method of claim 1, further comprising polling at least one of the plurality of resources to determine if the resource is available.

5. The method of claim 1, wherein the selected resource comprises a single resource.

6. The method of claim 1 wherein the selected resource comprises multiple resources.

7. The method of claim 1, further comprising permitting users to select digital images for association with the plurality of resources.

8. The method of claim 1, wherein the displaying, in a user interface, indications of a plurality of resources, further comprises pinging the Internet Protocol address and port number of the plurality of resources to determine which of the resources is available.

9. A method for providing for communication in a network, comprising:
    creating a registry on at least one of a plurality of network access devices, the registry identifying each of a plurality of network resources by a corresponding Internet Protocol address and port number;
    determining on-line availability of the plurality of network resources by the at least one of a plurality of network access devices through communication between the at least one of a plurality of network access devices and at least one of the plurality of network resources;
    obtaining from the registry the corresponding Internet Protocol address and port number of the at least one of the plurality of network resources; and
    enabling a connection over the network between the at least one of a plurality of network access devices and the at least one of the plurality of network resources using the associated Internet Protocol address and port number of the at least one of the plurality of network resources.

10. The method of claim 9, wherein resources establish connections using information of the registry, the connections not including the at least one of a plurality of network access devices.

11. The method of claim 9, wherein the at least one of a plurality of network access devices is a single network access device.

12. The method of claim 11, wherein the single network access device has a permanent Internet Protocol address.

13. The method of claim 12, wherein the single network access device acts as a known origination point.

14. The method of claim 9, wherein at least one of a plurality of network access devices is an active registry.

15. The method of claim 14, further comprising transferring the active registry from one of the network access devices to another of the network access devices.

16. A method of allowing for communication between network access devices in a network, comprising:
    forming a registry on a first network access device, the registry including a corresponding Internet Protocol address and port number for each of a plurality of resources;
    making available to a second network access device an Internet Protocol address and a port number for a specified resource, the specified resource being one of the plurality of resources; and
    establishing a connection over the network between the second network access device and the specified resource using the Internet Protocol address and port number for the specified resource, the connection not including the first network access device.

17. The method of claim 16, further comprising forming a second registry on a third network access device, the second registry including the Internet Protocol address and the port number for each of the plurality of resources.

18. The method of claim 17, further comprising making available at least a portion of the second registry to the network access devices.

19. The method of claim 18, wherein the at least a portion of the second registry is made available to the network access devices if the registry on the first network access device becomes unavailable.

* * * * *

UNITED STATES PATENT AND TRADEMARK OFFICE
CERTIFICATE OF CORRECTION

| | |
|---|---|
| PATENT NO. | : 7,860,921 B2 |
| APPLICATION NO. | : 11/173856 |
| DATED | : December 28, 2010 |
| INVENTOR(S) | : Stephen J. Murrell et al. |

It is certified that error appears in the above-identified patent and that said Letters Patent is hereby corrected as shown below:

Title Page 2, Column 2, Section (56), Other Publications:
Line 53: change "19970502202626/www.macweek.com/mw¯1110/gw_hotli..."
to -- 19970502202626/www.macweek.com/mw_1110/gw_hotli... --.

Title Page 3, Column 1, Section (56), Other Publications:
Line 53: change "PovvWow" to -- PowWow --.

Title Page 3, Column 2, Section (56), Other Publications:
Line 63: change "Mlrabllis" to -- Mirabllis --.

Title Page 4, Column 2, Section (56), Other Publications:
Line 37: change "PowWov,v" to -- PowWow --.

Title Page 5, Column 2, Section (56), Other Publications:
Line 22: change "User', Guide" to -- User's Guide --.

Column 10:
Line 31: change "claim 1 wherein" to -- claim 1, wherein --.

Signed and Sealed this
Fifth Day of April, 2011

David J. Kappos
*Director of the United States Patent and Trademark Office*